(12) United States Patent
Yalawarmath

(10) Patent No.: US 12,147,278 B2
(45) Date of Patent: Nov. 19, 2024

(54) METHOD FOR PROVIDING A DISPLAY APPARATUS FOR COMPUTER NETWORKING AND TELEPHONY CABLES

(71) Applicant: Mitel Networks Corporation, Kanata (CA)

(72) Inventor: Anilkumar Yalawarmath, Attiguppe Bengaluru (IN)

(73) Assignee: Mitel Networks Corporation, Kanata (CA)

( * ) Notice: Subject to any disclaimer, the term of this patent is extended or adjusted under 35 U.S.C. 154(b) by 209 days.

(21) Appl. No.: 17/855,504

(22) Filed: Jun. 30, 2022

(65) Prior Publication Data

US 2024/0004437 A1   Jan. 4, 2024

(51) Int. Cl.
*G09G 5/00* (2006.01)
*G06F 1/16* (2006.01)

(52) U.S. Cl.
CPC .......... *G06F 1/1683* (2013.01); *G06F 1/1626* (2013.01); *G06F 1/1637* (2013.01)

(58) Field of Classification Search
CPC .... G06F 1/1683; G06F 1/1626; G06F 1/1637; H04L 41/0866; H04L 43/0817; H04L 41/0853; H04L 41/22; H04L 41/24
USPC ............................ 345/156; 340/8.1; 709/224
See application file for complete search history.

(56) References Cited

U.S. PATENT DOCUMENTS

| | | | |
|---|---|---|---|
| 6,629,269 B1 | 9/2003 | Kahkoska | |
| 9,749,039 B1* | 8/2017 | Chen | H04B 10/073 |
| 9,749,839 B2 | 8/2017 | Chen et al. | |
| 2014/0258504 A1* | 9/2014 | Kahkoska | H04L 43/12 |
| | | | 709/224 |
| 2015/0170483 A1* | 6/2015 | DeCusatis | G06K 7/10158 |
| | | | 340/8.1 |
| 2017/0048132 A1* | 2/2017 | Walker | H04L 43/0811 |
| 2018/0006894 A1* | 1/2018 | Power | H04L 41/24 |

* cited by examiner

*Primary Examiner* — Thuy N Pardo

(57) ABSTRACT

A display apparatus is configured to determine and display information related to one or more electronic devices. The display apparatus includes a housing having a screen, a processor, and at east a first apparatus port. A cable has a first end connected to the first apparatus port and a second end connected to a port of a first electronic device. The display apparatus receives information via an electronic signal from the first electronic device and is configured to display the information on the screen. In another embodiment, the display apparatus includes a second apparatus port, and a second cable has a first end connected to a second electronic device. The display apparatus receives information via an electronic signal from the second electronic device and is further configured to display that information on the screen.

20 Claims, 6 Drawing Sheets

METHOD FOR PROVIDING A DISPLAY APPARATUS FOR COMPUTER NETWORKING AND TELEPHONY CABLES

FIELD OF THE DISCLOSURE

The present disclosure generally relates to a display that shows the status of ports and electronic devices (or devices) to which cables or wires, such as local area network (LAN) cables, are attached.

BACKGROUND OF THE DISCLOSURE

Organizations that utilize routers, switches, hubs, servers, or other electronic devices often face difficulties to trace a port and find the proper electronic device (or device) connected to a cable when there are large numbers of cables (also called "data cables" or "LAN cables," although this disclosure refers to any type of wire, cable, port, or wired connection) connected to the electronic device. Significant time can be spent locating the proper cable and/or tracing it to a specific electronic device port.

Further, an electronic device to which a cable is connected may not be ascertainable due to (1) a faulty cable or faulty port on the electronic device, or (2) it being tedious to trace the cable to an electronic device due to a large number of cables present, such as in a server room, where there may be limited physical access to all of the electronic devices. Also, if one person initially connected the cables and another is later troubleshooting port or device issues, it can lead to further difficulty because the troubleshooter was not involved in the original setup.

Presently, if there is an issue with a port, a user (or troubleshooter) must often use a computer to log into the switch, router, hub, server, or other electronic device, check for the port status, and determine if the port status is good or if something is wrong. The user can also find the internet protocol (IP) address of the electronic device, the corresponding port, and trace the cable.

Figure 1:

Light-emitted diode (LED) color coding (as shown in FIG. 1) is known and is currently provided on some cables. However, such LED color coding is limited to just the configurable color and does not provide detailed information regarding whether a port connection itself is proper or the status of the electronic device that includes the port.

E-ink tags (such as the one shown in FIG. 2) are known and are used, for example, in retail stores to temporarily display information for a consumer. A retail employee (such as a "tech") uses an employee device to update the display on each shelf or for each item. Such displays show that low-power display capabilities exist. The E-ink screen only uses power when it changes its pixels, and the power is supplied by the employee device.

Currently, a way to utilize E-ink tag technology to identify ports and connections to devices is by barcoding labels and referring to a registry of connections.

BRIEF DESCRIPTION OF THE DRAWING FIGURES

Figure 2:
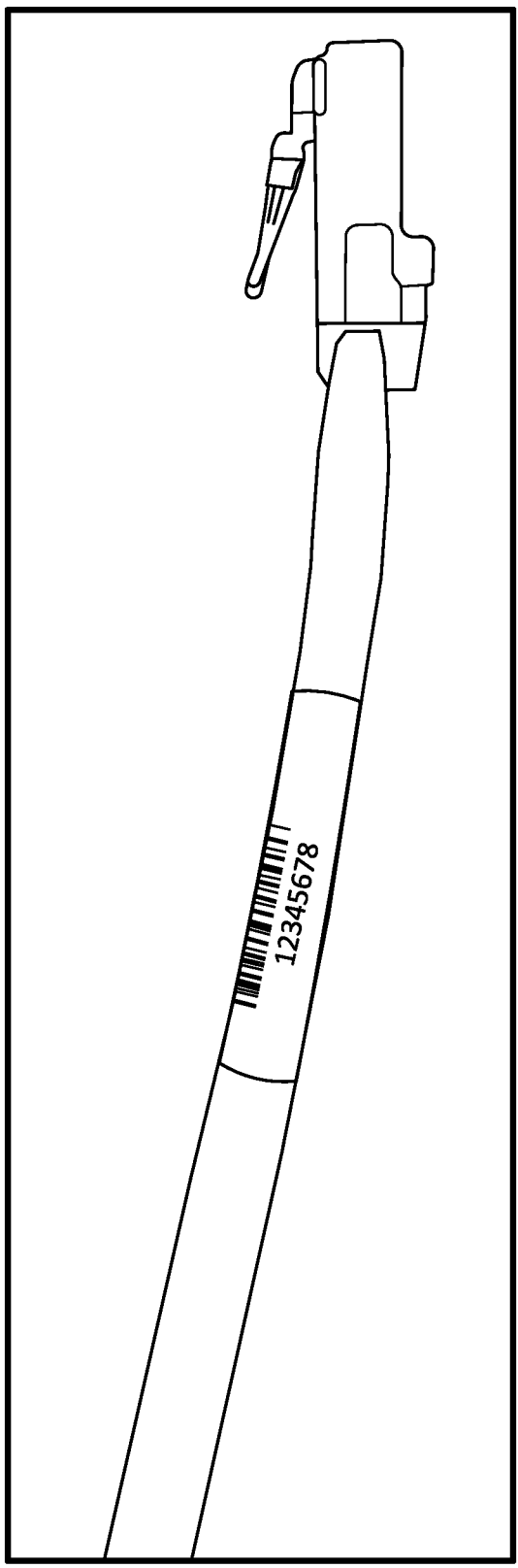
Figure 3:
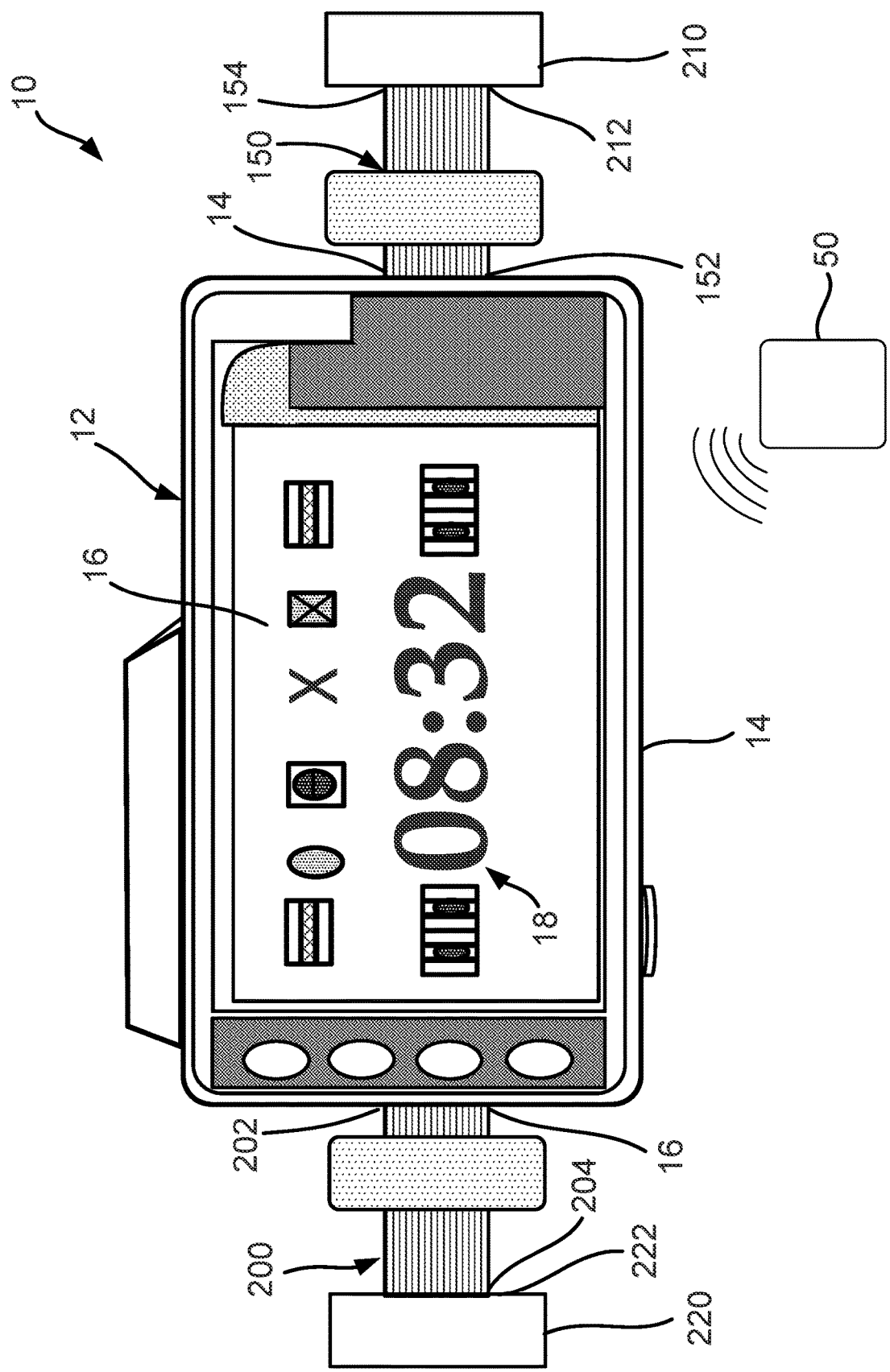
Figure 4:
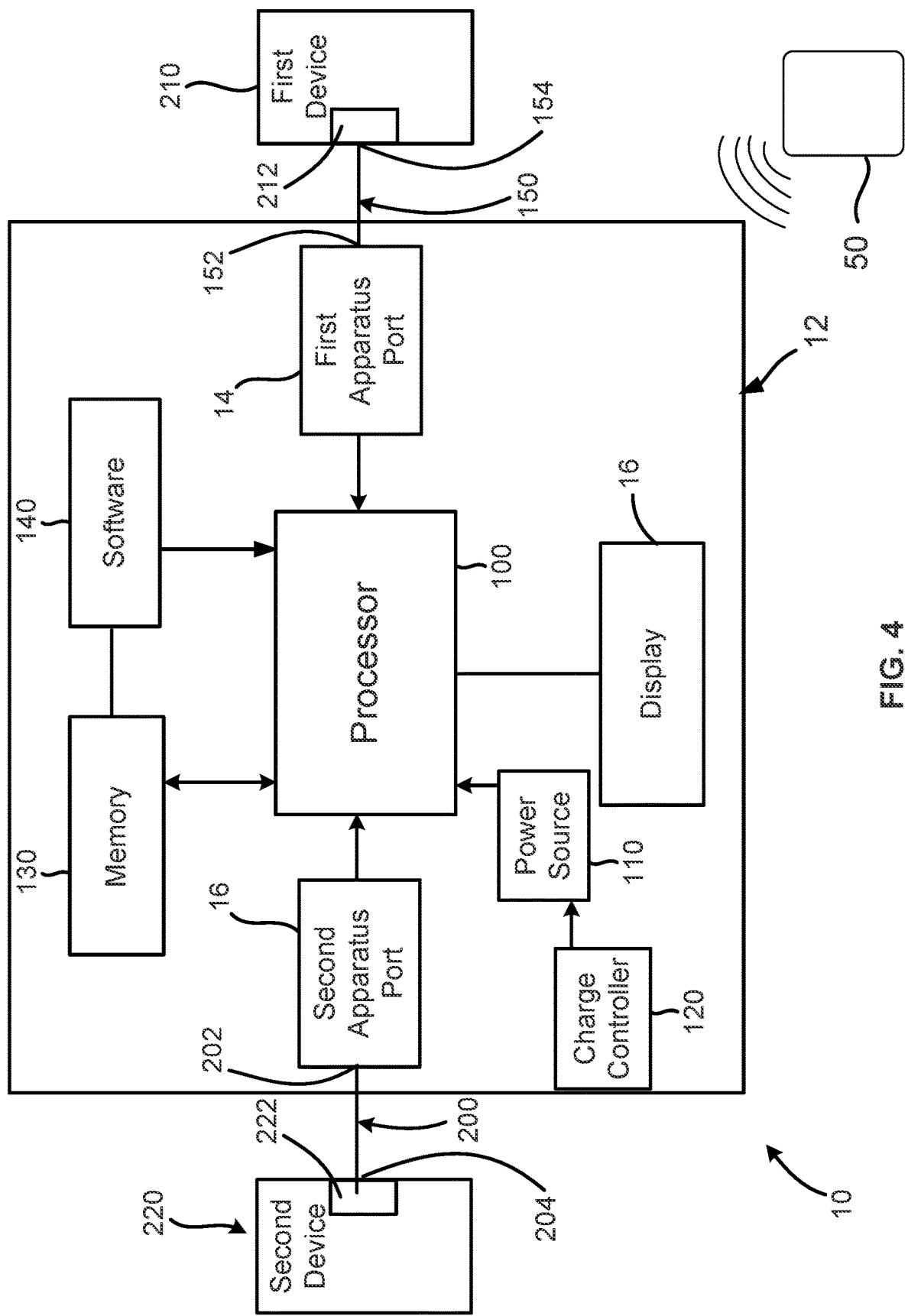
Figure 5:
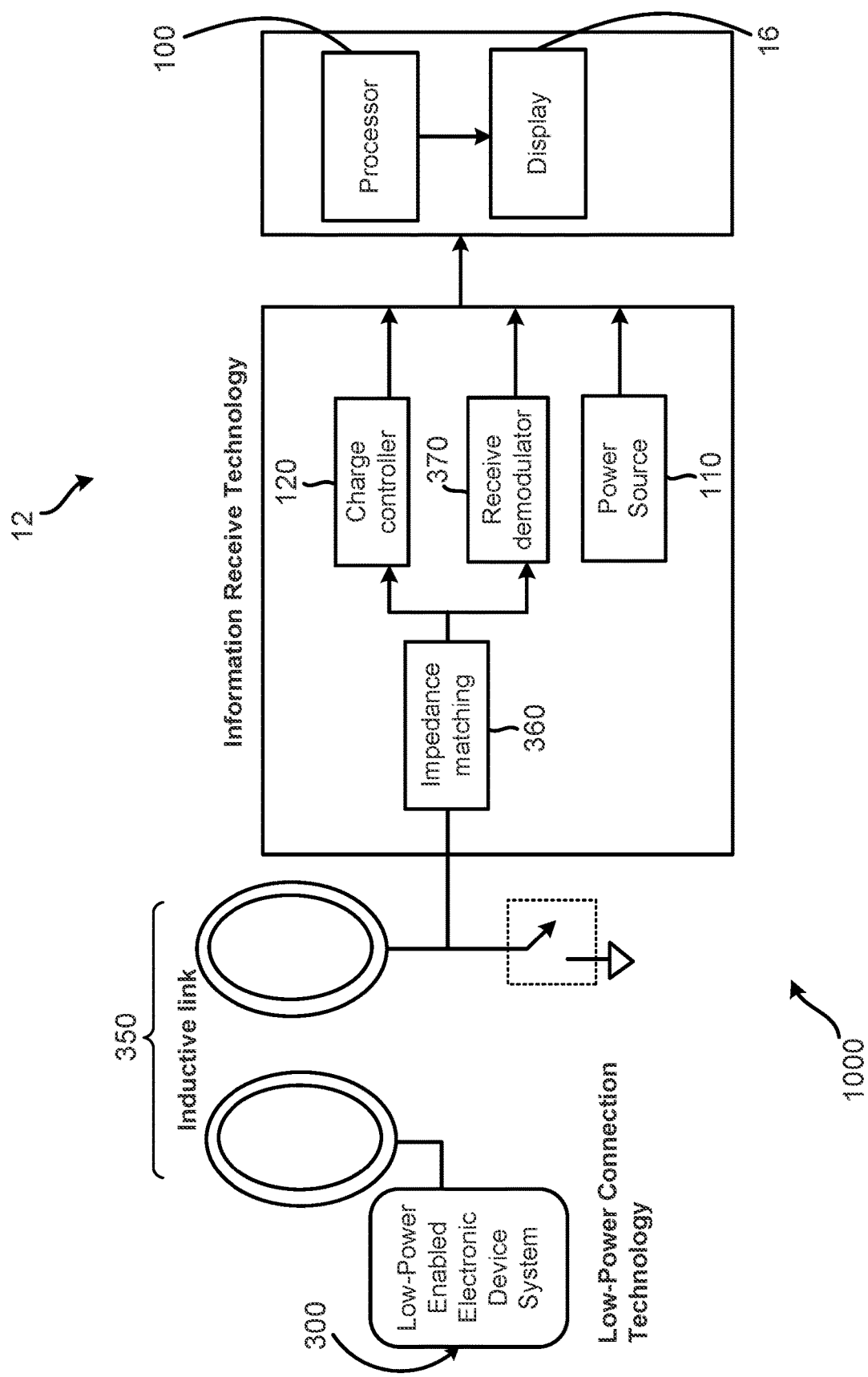
Figure 6:
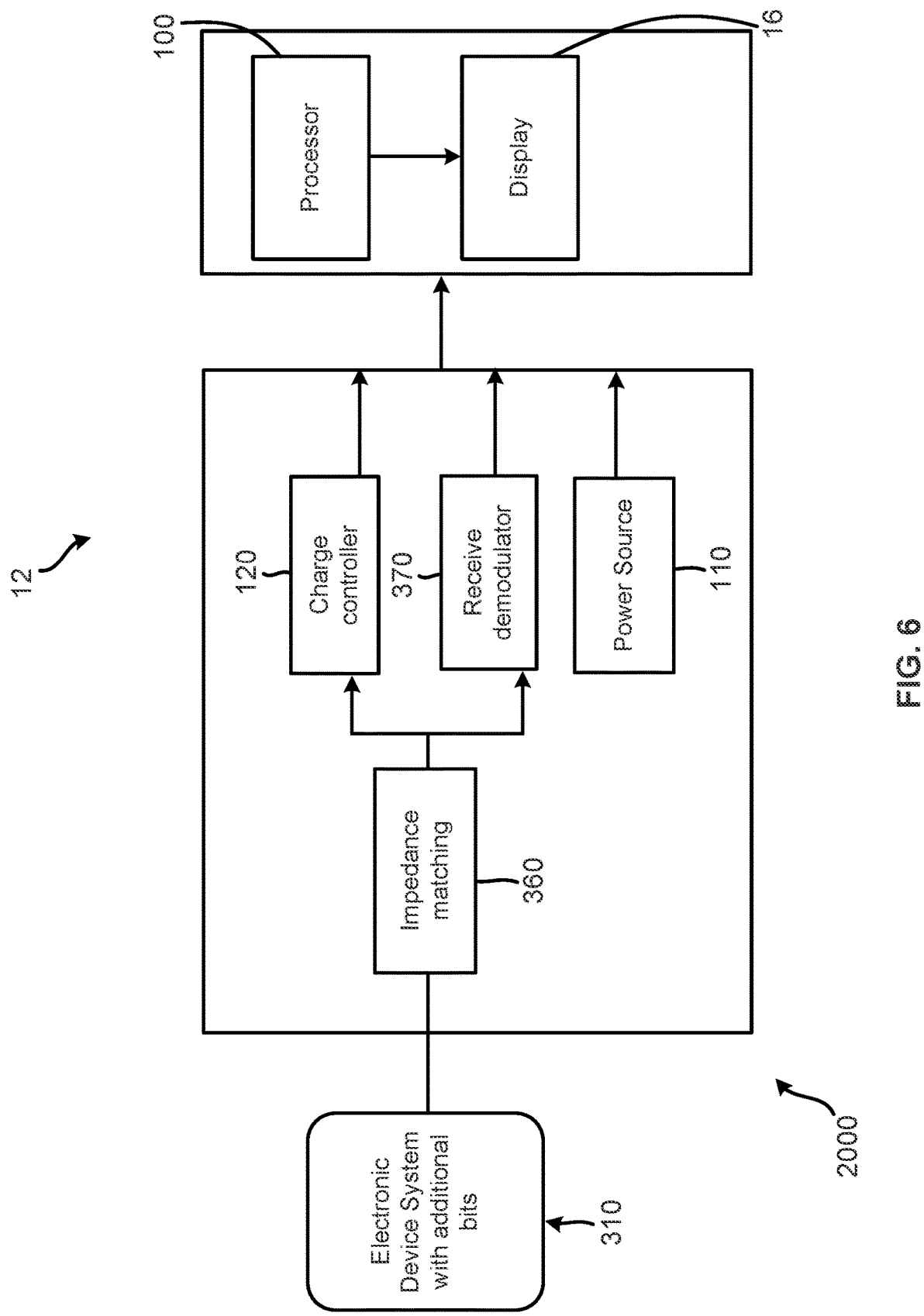

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

FIG. 1 shows a prior art device.
FIG. 2 shows a prior art device.
FIG. 3 shows a device according to aspects of this disclosure connected to cables.
FIG. 4 shows a block diagram of components used in a system according to aspects of this disclosure.
FIG. 5 shows a hardware block diagram of a system according to aspects of this disclosure.
FIG. 6 shows a block diagram of an alternate system according to aspects of this disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION

The description of exemplary embodiments of the present invention provided below is merely exemplary and is intended for purposes of illustration only. The following description is not intended to limit the scope of the invention disclosed herein. Moreover, recitation of multiple embodiments having stated features is not intended to exclude other embodiments having additional features or other embodiments incorporating different combinations of the stated features.

As used herein, "tangible, non-transitory memory" refers to computer program instructions, encoded on computer storage medium for execution by, or to control the operation of, data processing apparatus. Alternatively, or additionally, the program instructions can be encoded on an artificially-generated propagated signal, e.g., a machine-generated electrical, optical, or electromagnetic signal, which is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices). In accordance with examples of the disclosure, a non-transient computer readable medium containing program can perform functions of one or more methods, modules, engines and/or other system components as described herein.

As used herein, "database" refers to any suitable database for storing information, electronic files or code to be utilized to practice embodiments of this disclosure. As used herein, "server" refers to any suitable server, computer or computing device for performing functions utilized to practice embodiments of this disclosure.

As used herein, "software" refers to programs or other operating information utilized by a processor or other computing hardware.

Embodiments of this disclosure enable an identification method for finding the correct cable connected to one or two electronic devices, and information related to ports and the electronic devices providing a display apparatus that includes a display. The display apparatus is connected to a first end of a cable and the second end of the cable is connected to an electronic device. The information shown on the display can include essentially anything regarding the connection to a device port, such as port details, and regarding the electronic device, such as its identification and diagnostic information. Utilizing the display apparatus, the identity of the device internet protocol (IP) and device media access control (MAC) can also be displayed. The display apparatus (or screen) may use organic light emitting diodes (OLED). The display apparatus is preferably positioned in a cable connection between a first electronic device and a second electronic device, as explained herein.

The display apparatus can be used with virtually any technology wherein a port is required for a connection. The display apparatus cannot only display the electronic device(s) to which it is connected and the purpose of each electronic device, but to also indicate the validity of such connections (a bad connection would be indicated on the screen) in case the connection is not appropriate (e.g., the cable is connected to the wrong port, or the port is not functioning properly). When a cable is plugged into the wrong port the display apparatus will display that information on its screen.

This display apparatus is not preconfigured before being connected to a cable that is connected to an electronic device, and once connected the electronic device can immediately provide information to the display apparatus.

Turning to the Figures, wherein the purpose is to describe embodiments of this disclosure and not limit the scope of the claims, FIGS. 3-4 depict an exemplary system (10) that includes an exemplary display apparatus 12.

System 10 generally comprises (1) a display apparatus 12, (2) a first cable 150, which can be a LAN cable or any suitable cable or wire, (3) a second cable 200, which can be a LAN cable or any suitable cable or wire, (4) a first electronic device 210 connected to the first cable 150 via port 212, and (5) a second electronic device 220 connected to the second cable 200 via port 222. A display apparatus 12 according to this disclosure is configured to connect to at least one electronic device, such as first electronic device 210 or second electronic device 220, and as shown is connected to both of first electronic device 210 and second electronic device 220. Thus, display apparatus 12 also functions as part of the electrical connection between first electronic device 210 and second electronic device 220.

Each of electronic devices 210 and 220 can be any suitable device, such as a switch, router, hub, server, computer, or other electronic device. First electronic device 210 has a port 212 that is configured to connect to second end 154 of first cable 150. First end 152 of cable 150 is connected to a first apparatus port 14 of display apparatus 12. Second electronic device 220 has a port 222 that is connected to second end 204 of second cable 200. First end 202 of cable 200 is connected to second apparatus port 16 of display apparatus 12.

Via the electrical connection between first electronic device 210 through first cable 150 to first apparatus port 14, information about port 212 and device 210 can be communicated to display apparatus 12. Via the electrical connection between second electronic device 220 through second cable 200 to second apparatus port 16, information about port 222 and second device 220 can be communicated to display apparatus 12.

As best seen in FIG. 3, display apparatus 12 has a housing 14 that includes a screen 16. As shown, screen 16 is configured to display indicia 18 either continuously or when queried by a user device 50. User device 50 could be a cell phone, computer, personal digital assistant (PDA), or other suitable device and may query device apparatus 12 using any suitable wireless technology, such as low-power electronic signals. Or device apparatus 12 may constantly display information as indicia 18 and be powered by one or both of cables 150 and 200 and/or by a power source 110, which may be a rechargeable lithium-ion (Li-ion) battery. In one embodiment, the battery is a Thinergy MEC201 with 1 mAh capacity and a thickness of 0.17 millimeter (mm). As shown in FIG. 4, the power source 110 is connected to a charge controller 120 by which the power source 110 may be recharged. The charge controller 120 may receive electrical power from one or both of cables 150 and 200 and use the electrical power to charge power source 110. Charge controller 120 regulates the amount of electrical power provided to or taken from battery 110.

Indicia 18 can include any suitable information, such as one or more of (1) time, (2) the name of one or both devices 210 and 220, the IP address of one or both of devices 210 and 220, (3) the MAC address of one or both of devices 210 and 220, (4) the status of port 222 and/or port 212, (5) the name (e.g., server or router) of device 210 and/or device 220, (6) diagnostic information related to device 210 and/or 220, and (7) the status of power source 110 and of display apparatus 12 itself.

The display 16 utilizes any suitable technology for presenting visual information and one type that may be utilized is organic light emitting diode (OLED) technology.

Turning again to FIG. 4, various internal components of a system 10 according to this disclosure are shown.

The first device port 212 sends information through first cable 150 to first apparatus port 14, which in turn sends the information to processor 100. The second device port 222 sends information through second cable 200 to second apparatus port 16, which in turn sends the information to processor 100. The information may include, but is not limited to, the information that can be displayed using indicia 18, which is recited above.

The processor is in communication with one or more of a memory 130 and software 140. Either memory 130 or software 140, or both, may be resident on processor 100, or may be resident elsewhere. Memory 130 is a tangible, non-transitory memory configured to communicate with the processor, wherein the tangible, non-transitory memory comprises instructions stored thereon that, in response to execution by the processor, cause the first apparatus port to receive information via an electronic signal from a first device when the display apparatus is connected to the first end of the first cable and the first device is connected to a second end of the first cable.

Based on instructions and information received from memory 130 and software 140, processor 100 controls the operation of display 16 and can change indicia 18 appropriately. Memory 130 can also store information received from cable 150 and/or cable 200 for use in comparing (or saving for later review by an operator or computing device) the function of the device ports 154 and 204 over time and/or the devices 210 and 220 over time.

Turning now to FIG. 5, an alternative system 1000 is shown in which low-power wireless communications are used to transmit information from first electronic device 210 to cable 150 and/or from second electronic device 220 to cable 200. Processor 100, display 16, charge controller 120, and power source 110 have been previously described.

A low power enabled electronic device 300 is present on the cable and device in order for them to communicate through an inductive link 350 utilizing impedance matching 360, which is a wireless communication method known to those skilled in the art. Inductive linking (or coupling) refers to the transfer of energy from one circuit component to another through a shared magnetic field. A change in current flow through one device induces current flow in the other device. Inductive coupling favors low-frequency energy sources.

Using low power after capturing the IP/MAC address from an electronic device, such as device 210 or 220, transfers the data using the inductive link and the circuit data sent will be demodulated by demodulator 370 and later will be displayed on the display screen 16 as directed processor 100.

Impedance matching, known to persons skilled in the art, is a process of designing the input impedance and output impedance of an electrical load to minimize the signal reflection or maximize the power transfer of the load.

The receive demodulator 370, as known to persons skilled in the art, extracts the original information-bearing signal from a carrier wave. Receive demodulator 370 is an electronic circuit (or computer program in a software-defined radio) that is used to recover the information content from the modulated carrier wave.

Turning now to FIG. 6, an alternative system 2000 is shown. System 2000 is all respects the same as system 1000 except that it utilizes except that it uses an electronic device system 310 with additional bits.

The method proposed could utilize the software 140 to command a device port 212 or 220 to send information to the display apparatus 12. This means the displayed information (indicia 18) is controlled by the display apparatus 12 whenever a cable is connected.

In other scenarios, certain cabling technologies can support LED colors and power, in which case the display apparatus 12 can receive information regarding connections directly from wires inside a cable 150 or 200.

The features of the various embodiments may be stand alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. A display apparatus configured to determine information related to one or more devices, wherein the display apparatus comprises:
   a housing including a screen and a first apparatus port configured to be connected to a first end of a first cable;
   a processor;
   a tangible, non-transitory memory configured to communicate with the processor, wherein the tangible, non-transitory memory comprises instructions stored thereon that, in response to execution by the processor, cause the first apparatus port to receive information via an electronic signal from a first device when the display apparatus is connected to the first end of the first cable and the first device is connected to a second end of the first cable; and
   a second apparatus port configured to be connected to a first end of a second cable, wherein the instructions stored on the tangible, non-transitory memory, in response to execution by the processor, cause the display apparatus to receive information via an electronic signal from a second device when the display apparatus is connected to the first end of the second cable and the second device is connected to a second end of the second cable;
   and wherein the processor is configured to display the information on the screen.

2. The display apparatus of claim 1, wherein the information includes one or more of (a) an internet protocol (IP) address, (b) a media access control (MAC) address, (c) a name of the first device, and (d) a name of the second device.

3. The display apparatus of claim 1, wherein the first device and the second device are each one of a switch, a router, a hub, and a computer.

4. The display apparatus of claim 1 that is further configured to display on the screen one or more of (a) whether there is a proper connection between the first cable and the first device, (b) whether there is a proper connection between the first cable and the display apparatus, (c) whether there is a proper connection between the second cable and the second device, (d) whether there is a proper connection between the second cable and the display apparatus, (e) a unique identifier for the first device and the second device, and (f) a unique identifier for the display apparatus.

5. The display apparatus of claim 1, wherein the processor is configured to simultaneously receive electronic signals from the first device and the second device.

6. The display apparatus of claim 1, wherein the information is displayed when the display apparatus is queried and powered by a user device utilizing low-power technology.

7. The display apparatus of claim 6, wherein the low-power technology is generated by inbuilt software operable on the user device.

8. The display apparatus of claim 1, wherein the screen utilizes organic electrolumenesant material light emitting diodes ("OLED").

9. A method of determining cable connectivity information by utilizing a display apparatus having a processor, software operable on the processor, a screen, a first apparatus port connected to a first end of a first cable, and a second apparatus port connected to a first end of a second cable, wherein the first cable has a second end connected to a port of a first device and the second cable has a second end connected to a port of a second device, wherein the method comprises the following steps:
   the display apparatus receiving an electronic signal from one or both of the first device and the second device;
   the software operating on the processor to translate the electronic signal; and
   the processor displaying on the screen (a) the translated electronic signal, wherein the translated electronic signal includes the identification of the first device and the identification of the second device, and (b) an error message that indicates if (i) the first cable or the second cable is not properly connected, (ii) the device is powered off, (iii) the device port is not functioning properly, or (iv) there are fluctuations of the device that adversely affect its performance.

10. The method of claim 9 that further comprises the step of generating a unique identifier for the display apparatus, wherein the unique identifier is associated with the first device and the second device.

11. The method of claim 9 that further includes the step of the display apparatus displaying the information on the screen when queried and powered by a user device.

12. The method of claim 11, wherein the user device is one of a cell phone, a computer, and a personal digital assistant (PDA).

13. A system for determining cable connectivity information, wherein the system comprises:
- a display apparatus comprising a processor, software operable on the processor, a first apparatus port connected to a first end of a first cable, a second apparatus port connected to a first end of a second cable, and a screen; and
- a first device having a first device port connected to a second end of the first cable and a second device having a second device port connected to a second end of the second cable;
- wherein, the processor is configured to receive an electronic signal from one or both of the first device and the second device in order to determine information about the first device and the second device, and the processor is further configured to display at least some of the information on the screen, and wherein the screen is configured to dynamically change based on one or more of (a) whether the first cable is properly connected to the display apparatus, (b) whether the first cable is properly connected to the first device, (c) whether the second cable is properly connected to the display apparatus, (d) whether the second cable is properly connected to the second device, and (e) a change of the device to which the first cable or the second cable is connected.

14. The system of claim 13 that comprises a plurality of display apparatuses each of which includes a unique identifier.

15. The system of claim 13, wherein the processor is further configured to generate an error message on the screen if (a) the first cable or the second cable is not properly connected, (b) the device is powered off, (c) the device port is not functioning properly, or (d) there are fluctuations of the device that adversely affect its performance.

16. The system of claim 13 that further includes a user device configured to query and power the display apparatus, wherein the screen is configured to display information in response to the query.

17. The system of claim 13, wherein the display apparatus further includes a battery.

18. The display apparatus of claim 1 that is configured to continuously display the information on the screen.

19. The system of claim 13, wherein the information includes one or more of (a) an internet protocol (IP) address, (b) a media access control (MAC) address, (c) a name of the first device, (d) a name of the second device, and (e) the status of a power source for the display apparatus, and (f) a status of the display apparatus.

20. The system of claim 13, wherein the display apparatus is configured to be charged by one or both of the first cable and the second cable.

\* \* \* \* \*